United States Patent
Yoshimura

(10) Patent No.: US 10,124,469 B2
(45) Date of Patent: Nov. 13, 2018

(54) CLAMPING APPARATUS

(71) Applicant: KOSMEK LTD., Hyogo (JP)

(72) Inventor: Gaku Yoshimura, Hyogo (JP)

(73) Assignee: KOSEMEK LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/034,366

(22) PCT Filed: Nov. 27, 2014

(86) PCT No.: PCT/JP2014/081467
§ 371 (c)(1),
(2) Date: May 4, 2016

(87) PCT Pub. No.: WO2015/083625
PCT Pub. Date: Jun. 11, 2015

(65) Prior Publication Data
US 2016/0288297 A1   Oct. 6, 2016

(30) Foreign Application Priority Data

Dec. 5, 2013  (JP) ................................. 2013-266021

(51) Int. Cl.
*B23Q 1/00* (2006.01)
*B25B 5/06* (2006.01)
(Continued)

(52) U.S. Cl.
CPC .......... *B25B 5/061* (2013.01); *B23B 31/4053* (2013.01); *B23Q 1/0081* (2013.01); *B23Q 3/082* (2013.01); *B25B 5/14* (2013.01)

(58) Field of Classification Search
CPC .. B23B 31/4053; B23Q 1/0081; B23Q 1/009; B23Q 3/06; B23Q 3/082
See application file for complete search history.

(56) References Cited

U.S. PATENT DOCUMENTS 1,909,323 A   5/1933  Warren
4,909,493 A * 3/1990  Yonezawa ............... B25B 5/087
                                                                 269/309
(Continued)

FOREIGN PATENT DOCUMENTS

CN        1735476 A    2/2006
CN      103237624 A    8/2013
(Continued)

OTHER PUBLICATIONS

English translation of International Preliminary Report on Patentability including the Written Opinion for PCT/JP2014/081467.
(Continued)

*Primary Examiner* — Tyrone V Hall, Jr.
(74) *Attorney, Agent, or Firm* — Bacon & Thomas, PLLC

(57) ABSTRACT

A pair of locking members (22) (22) protruding upward relative to a housing (1) and configured to be inserted into a hole of a workpiece are arranged to be capable of being respectively pressed onto right end left portions of an inner peripheral surface of the hole. Wedge surfaces (33) (33) of a clamp rod (32) are respectively engaged with the locking members (22) (22) from above. The clamp rod (32) is driven by a driving means (D) downward for clamping and upward for unclamping. The clamp rod (32) includes recesses (50) (50) formed, in an outer peripheral surface of the clamp rod (32), at a portion of the clamp rod (32) which is located below the wedge surfaces (33) (33). The recesses (50) (50) accommodate the locking members (22) (22) so that inner lower portions of the locking members (22) (22) in an unclamping position contact each other.

6 Claims, 3 Drawing Sheets

(51) Int. Cl.
B23Q 3/08 (2006.01)
B25B 5/14 (2006.01)
B23B 31/40 (2006.01)

(56) References Cited

U.S. PATENT DOCUMENTS

| | | | | |
|---|---|---|---|---|
| 6,024,354 | A * | 2/2000 | Yonezawa | B23Q 1/0081 269/309 |
| 6,095,509 | A * | 8/2000 | Yonezawa | B23B 31/202 269/309 |
| 7,448,607 | B2 * | 11/2008 | Steele | B25B 5/087 269/24 |
| 2005/0121846 | A1 * | 6/2005 | Kawakami | B23Q 1/009 269/309 |
| 2006/0033255 | A1 * | 2/2006 | Yonezawa | B23Q 1/009 269/309 |
| 2006/0049565 | A1 * | 3/2006 | Petit | B25B 5/087 269/32 |
| 2006/0049568 | A1 * | 3/2006 | Yonezawa | B23B 31/402 269/309 |
| 2011/0133381 | A1 * | 6/2011 | Kawakami | B23Q 1/009 269/25 |
| 2013/0153838 | A1 * | 6/2013 | Kamiyoshi | F22B 37/003 254/133 R |
| 2013/0249156 | A1 | 9/2013 | Haruna et al. | |

FOREIGN PATENT DOCUMENTS

| | | | |
|---|---|---|---|
| EP | 1588795 A1 | 10/2005 | |
| EP | 2025471 A2 * | 2/2009 | ............ B23Q 1/009 |
| JP | H11188551 A | 7/1999 | |
| JP | 200540922 A | 2/2005 | |
| JP | 2004209607 A | 2/2006 | |
| JP | 201036314 A | 2/2010 | |
| WO | 2012073723 A1 | 6/2012 | |

OTHER PUBLICATIONS

Office Action for Chinese Application 201480066098.9 dated Mar. 21, 2017 with English translation.
International Preliminary Report on Patentability (IPRP) including Written Opinion of corresponding International application No. PCT/JP2014/081467 dated Jun. 7, 2016.
International Search Report for PCT/JP2014/081467 and English translation of same.
Japanese Office Action in corresponding Japanese Patent Application No. 2013-266021 dated Aug. 8, 2017.
European Patent Office Extended European Search Report dated Jul. 18, 2017.

* cited by examiner

CLAMPING APPARATUS

TECHNICAL FIELD

The present invention relates to a clamping apparatus. In particular, the present invention relates to an apparatus configured to clamp a to-be-clamped object such as a workpiece or a die, with the use of a hole formed in the to-be-clamped object.

BACKGROUND ART

Known clamping apparatuses of this type include an apparatus described in Patent Literature 1 (Japanese Unexamined Patent Publication No. 36314/2010 (Tokukai 2010-36314)). The above known apparatus is structured as follows.

Four locking members (grippers) to be inserted into a hole of a to-be-clamped object are arranged circumferentially into an annular shape. Wedge surfaces provided at an upper portion of a clamp rod are respectively engaged, from above, with inclined surfaces provided on inner peripheries of upper half portions of the locking members. Further, inner peripheral surfaces of lower half portions of the locking members are in contact with an outer peripheral surface of a lower portion of the clamp rod.

For clamping, while the locking members are held at an upper position with a predetermined force, the clamp rod is driven downward. Then, the locking members first move radially outward, to come into close contact with an inner peripheral surface of the hole. Subsequently, the to-be-clamped object is lowered through the locking members and the inner peripheral surface of the hole which are in a close contact state, so that the to-be-clamped object is clamped on a seating surface.

CITATION LIST

Patent Literature

Patent Literature 1: Japanese Unexamined Patent Publication No. 36314/2010 (Tokukai 2010-36314)

SUMMARY OF INVENTION

Technical Problem

The known clamping apparatus is configured so that, for clamping a to-be-clamped object having a smaller-diameter hole, the outer diameter size of the clamp rod is reduced, to decrease the outer diameter size of the annular shape of the locking members (grippers) when the locking members in the annular shape are switched to an unclamping position. However, there is a limitation in terms of strength in the reduction of the outer diameter size of the clamp rod. Because of this, there has been room for improvement in clamping of to-be-clamped objects each having a smaller-diameter hole.

An object of the present invention is to provide a clamping apparatus capable of clamping a to-be-clamped object having a smaller-diameter hole.

Solution to Problem

To achieve the above object, the present invention structures a clamping apparatus as follows, for example, as shown in FIG. 1A to FIG. 3B.

A pair of locking members 22, 22 protruding toward a leading end side relative to a housing 1 and configured to be inserted into a hole of a to-be-clamped object are arranged to be capable of being respectively pressed onto opposed portions of an inner peripheral surface of the hole. An advancing means 38 configured to push the locking members 22, 22 with a predetermined force toward the leading end side is provided. Wedge surfaces 33, 33 of the clamp rod 32 are respectively engaged with the locking members 22, 22 from the leading end side. The clamp rod 32 is configured to be driven by a driving means D toward a base end side for clamping and toward leading end side for unclamping. Further, recesses 50, 50 are formed, in an outer peripheral surface of the clamp rod 32, at a portion of the clamp rod 32 which is located on the base end side relative to the wedge surfaces 33, 33, the recesses 50, 50 being configured to respectively accommodate the locking members 22, 22 in such a manner that inner base portions of the locking members 22, 22 in an unclamping position are allowed to contact each other or to get closer to each other.

The present invention brings about the following functions and effects.

The apparatus is configured as follows: the pair of locking members configured to be inserted into the hole of the to-be-clamped object and to be pressed onto the opposed portions of the inner peripheral surface of the hole are provided; the recesses configured to respectively accommodate the inner base portions of the locking members in the unclamping position are formed, in the outer peripheral surface of the clamp rod, at the portion of the clamp rod which is located on the base end side relative to the wedge surfaces; and the inner base portions of the pair of locking members are allowed to contact each other or to get closer to each other. With this configuration, the pair of locking members in the unclamping position has a significantly smaller outer diameter size.

Thus, there is provided the clamping apparatus capable of clamping a to-be-clamped object having a smaller-diameter hole.

In the present invention, it is preferable that the recesses 50, 50 are communicatively connected to each other inside the clamp rod 32.

This arrangement enables each recess to have a larger depth, and this further reduces the outer diameter size of the pair of locking members in the unclamping position. Thus, the clamping apparatus is capable of clamping a to-be-clamped object having a hole with a further smaller diameter.

In the present invention, it is preferable that an inclination angle of each wedge surface 33 relative to an axis of the clamp rod 32 is set within a range from 10 degrees to 40 degrees, and it is more preferable that the inclination angle is set within a range from 15 degrees to 25 degrees.

Setting the inclination angle of each wedge surface to a relatively large value increases the radially movable distance of each locking member. For this reason, there is provided the clamping apparatus having a wide allowable range with respect to the diameter of the hole of the to-be-clamped object. As a result, a to-be-clamped object having a smaller-diameter hole and a to-be-clamped object having a larger-diameter hole can be dealt with by the single clamping apparatus.

Further, it is preferable to incorporate the following feature into the present invention.

The driving means D includes a piston 7 inserted into the housing 1, and a piston rod 8 protruding from the piston 7 toward the leading end side. In addition, the advancing means 38 includes a support cylinder 39 and a spring 40 urging the support cylinder 39 toward the leading end side, the support cylinder 39 being inserted into an annular space between the housing 1 and the piston rod 8 and being capable of receiving the locking members 22, 22 from the base end side. A connection cylinder 42 connecting the piston rod 8 with the clamp rod 32 is inserted into an annular space between the support cylinder 39 and the piston rod 8, and the connection cylinder 42 and the piston rod 8 are fixed to each other by a connection pin 43 extending radially. Both end portions of the connection pin 43 are respectively inserted into pin holes 47, 47 formed in a peripheral wall of the support cylinder 39. A base end wall of each pin hole 47 prevents the piston rod 8 from moving toward the base end side a distance greater than a predetermined distance relative to the support cylinder 39.

In this arrangement, if the clamping apparatus is driven for clamping without a workpiece or if the clamping apparatus is driven for clamping to try to clamp a workpiece having a hole with an excessively large diameter, the connection pin is received by the lower walls of the pin holes. Thus, the piston rod is prevented from descending a distance greater than the predetermined distance, relative to the support cylinder. This prevents the pair of locking members from excessively moving radially outward.

It is preferable to incorporate the following feature into the above-described aspect of the invention.

A guide member 16 protruding toward the leading end side relative to the housing 1 is provided, and a peripheral wall 18 of the guide member 16 is configured to be insertable into the hole of the to-be-clamped object. The guide member 16 includes a guide groove 21 penetrating the peripheral wall 18, and the guide groove 21 is configured to support the corresponding locking member 22 so that the locking member 22 is movable radially. Further, the support cylinder 39 is configured to receive the locking members 22, 22 via the guide member 16 from the base end side.

In this arrangement, the locking members are smoothly inserted into the hole of the to-be-clamped object via the guide member.

DESCRIPTION OF EMBODIMENTS

Figure 1:
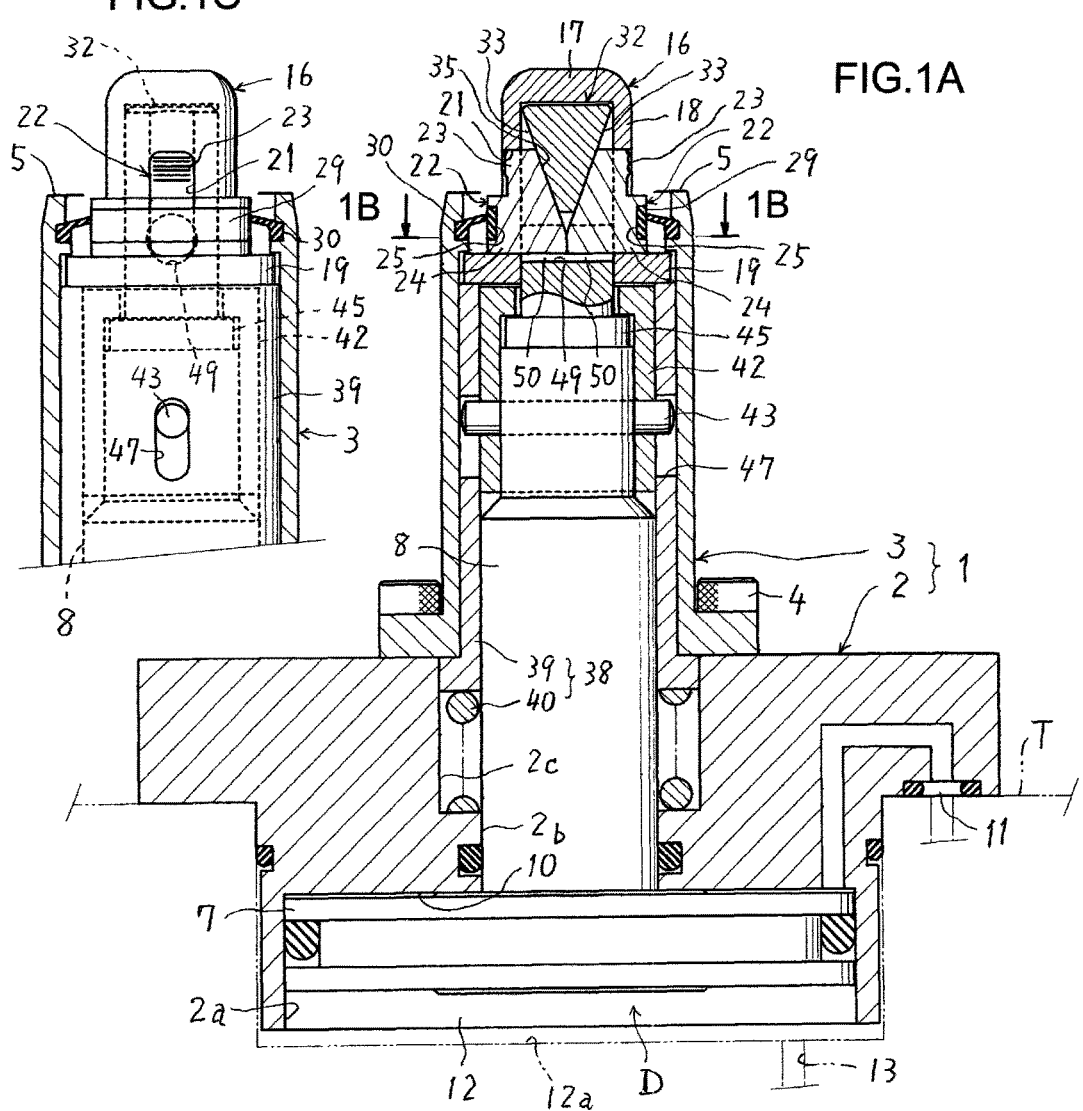
FIG. 1A shows an embodiment of the present invention, and is an elevational sectional view of a clamping apparatus in an unclamping state.
FIG. 1B is a section taken along a line 1B-1B of FIG. 1A.
FIG. 1C is a partial sectional view, viewed from the left side in FIG. 1A.
Figure 2:
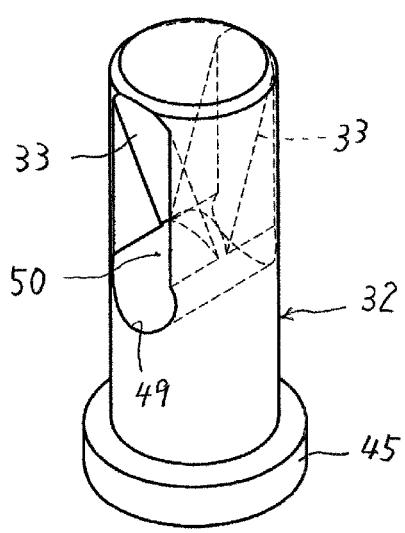
FIG. 2 is an enlarged perspective view of a clamp rod provided in the clamping apparatus.

FIG. 1A to FIG. 3B show an embodiment of the present invention. A clamping apparatus of this embodiment is used to clamp a workpiece functioning as a to-be-clamped object. First, with reference to FIG. 1A to FIG. 1C and FIG. 2, the structure of the clamping apparatus will be described.

A housing 1 is mounted on a stationary stand T such as a table. The housing 1 includes: a lower housing 2 fixed to the stationary stand T with a plurality of bolts (not illustrated); and a cylindrical upper housing 3 placed on a top surface of the lower housing 2. The lower housing 2 and the upper housing 3 are fastened to each other with a plurality of bolts 4. The lower housing 2 has a larger-diameter cylinder hole 2a, a smaller-diameter hole 2b, and a medium-diameter hole 2c, which are located from bottom to top in this order. Further, at the top of the upper housing 3, there is provided a seating surface 5 configured to receive a workpiece (not illustrated) functioning as the to-be-clamped object.

Into the cylinder hole 2a, a piston 7 is hermetically inserted. A piston rod 8 protruding upward from the piston 7 is hermetically inserted into the smaller-diameter hole 2b. Compressed air is supplied to and discharged from a clamp chamber 10 formed above the piston 7 through a supply and discharge port 11. Further, compressed air is supplied to and discharged from an unclamp chamber 12 formed below the piston 7 via a different supply and discharge port 13.

The piston 7, the piston rod 8, the clamp chamber 10, and the unclamp chamber 12 structure a driving means D for a clamp rod 32, which will be described later.

A guide member 16 is inserted into an upper portion of the upper housing 3 so as to be movable vertically (axially). The guide member 16 includes a top wall 17 and a peripheral wall 18 which are formed integrally and seamlessly. The guide member 16 protrudes upward (toward a leading end side) relative to an upper end (leading end) of the upper housing 3, and therefore the guide member 16 is insertable into a hole of the workpiece (these are not illustrated) functioning as the to-be-clamped object.

A flange portion 19 protrudes radially outward from a lower portion of the peripheral wall 18, and the flange portion 19 is inserted into the upper portion of the upper housing 3 so as to be to be movable radially (horizontally).

Through the peripheral wall 18, a pair of guide grooves 21, 21 are formed to face each other. In each guide groove 21, a locking member 22 is inserted so as to be movable radially (horizontally).

The locking member 22 includes: an engaging portion 23 configured to be pressed onto an inner peripheral surface of the hole of the workpiece; and a base portion 24 formed below the engaging portion 23. An under surface of the base portion 24 is supported by a top surface of the flange portion 19.

Each base portion 24 has an attachment groove 25 formed in its outer peripheral surface so as to extend circumferentially. An elastic member 29 formed into a thin strip-like shape and made of rubber or synthetic resin is fitted in the attachment grooves 25, 25 and on portions of an outer peripheral surface of the guide member 16. With this, the elastic member 29 urges each locking member 22 radially inward. That is to say, the elastic member 29 structures a returning means for the locking members 22, 22. In addition, a dust seal 30 is arranged between an upper portion of an inner peripheral surface of the upper housing 3 and the base portions 24. The dust seal 30 is made of synthetic resin or the like, and an inner periphery of the dust seal 30 is in contact with an outer peripheral surface of the elastic member 29. With this, the dust seal 30 urges the locking members 22, 22 and the guide member 16 radially inward.

The clamp rod 32 is insertable into the guide member 16 from below (from a base end side). Further, wedge surfaces 33, 33 provided in an upper portion of the clamp rod 32 are respectively engaged, from above, with inclined surfaces 35, 35 formed on respective inner surfaces of the locking members 22. Each wedge surface 33 and each inclined surface 35 are inclined so that the distance from the axis of the clamp rod 32 decreases toward their lower ends. In this embodiment, each wedge surface 33 and each inclined surface 35 are flat surfaces.

The inclination angle of each wedge surface 33 relative to the axis of the clamp rod 32 is set within a range from approximately 18 degrees to approximately 22 degrees in this embodiment. It is preferable that the inclination angle is set within a range from 15 degrees to 25 degrees. The inclination angle may be set within a range from 10 degrees to 40 degrees.

An advancing means 38 for pushing the guide member 16 with a predetermined force is provided. The advancing means 38 includes: a support cylinder 39 which is inserted into an annular space between the housing 1 and the piston rod 8 and is capable of receiving the locking members 22, 22 from below (from the base end side); and a spring 40 urging the support cylinder 39 upward. The support cylinder 39 receives the locking members 22, 22 from below via the guide member 16.

A connection cylinder 42 connecting the piston rod 8 with the clamp rod 32 is inserted into an annular space between the support cylinder 39 and the piston rod 8. The connection cylinder 42 and the piston rod 8 are fixed to each other by a connection pin 43 extending radially (horizontally). With this, a lower flange 45 of the clamp rod 32 is supported between an upper end portion of the connection cylinder 42 and an upper end surface of the piston rod 8 so as to be movable radially (horizontally).

Further, both end portions of the connection pin 43 are respectively inserted into pin holes 47, 47 formed through a peripheral wall of the support cylinder 39. A lower wall (base end wall) of each pin hole 47 prevents the piston rod 8 from moving downward (toward the base end side) a distance greater than a predetermined distance relative to the support cylinder 39.

Furthermore, the clamp rod 32 has a through hole 49 formed below the wedge surfaces 33 and extending in a direction substantially orthogonal to the axis of the clamp rod 32. As a result, a pair of recesses 50, 50 (see FIG. 2 and FIG. 3A) are formed in an outer peripheral surface of the clamp rod 32, at both end portions of the through hole 49. That is, in this embodiment, the pair of recesses 50, 50 are communicatively connected to each other.

In an unclamping state of FIG. 1A, each recess 50 accommodates an inner base portion of the corresponding locking member 22 in an unclamping position, and the inner lower portions of the locking members 22, 22 are in contact with each other. Instead of the above configuration in which the inner lower portions of the locking member 22, 22 are in contact with each other, the inner lower portions of the locking member 22, 22 may be close to each other with a predetermined gap between them.

The above-described clamping apparatus operates as follows.

In the unclamping state of FIG. 1A to FIG. 1C, compressed air in the clamp chamber 10 is discharged and compressed air is supplied to the unclamp chamber 12. With this, the piston 7 moves the clamp rod 32 to the higher unclamping position, the spring 40 moves the guide member 16 and each locking member 22 to the higher unclamping position via the support cylinder 39, and each locking member 22 is retracted radially inward, urged by the elastic member 29.

As a result, an outer peripheral surface of the engaging portion 23 of each locking member 22 is retracted inward relative to an outer peripheral surface of the peripheral wall 18 of the guide member 16. In addition, the inner lower portions of the pair of locking members 22, 22 come into contact with each other. Thus, when the workpiece is introduced as described below, the guide member 16 prevents a collision between a peripheral wall of the hole of the workpiece (these are not illustrated) with each locking member 22.

As the workpiece in the above unclamping state is lowered, the hole of the workpiece is fitted, with a predetermined gap, to the peripheral wall 18 of the guide member 16 and to the engaging portion 23 of each locking member 22, and an under surface of the workpiece is received by the seating surface 5 of the upper housing 3.

To change from the unclamping state of FIG. 1A to a clamping state, compressed air in the unclamp chamber 12 is discharged while compressed air is supplied to the clamp chamber 10, to lower the piston 7.

As a result, the clamp rod 32 first descends relative to the guide member 16 and the locking members 22, 22 held at a raised position by the urging force of the spring 40. Then, each wedge surface 33 of the clamp rod 32 pushes the corresponding locking member 22 radially outward, and therefore the engaging portion 23 of each locking member 22 is engaged with the hole of the workpiece (these are not illustrated), for example, by plastically deforming the inner peripheral surface of the hole or by frictionally contacting the inner peripheral surface. Subsequently, in the above engaged state, the clamp rod 32 drives each locking member 22 and the guide member 16 downward for locking, against the urging force of the spring 40. With this, the locking members 22, 22 pull the workpiece downward, with the result that the under surface of the workpiece is firmly clamped on the seating surface 5 of the upper housing 3.

Figure 3B:
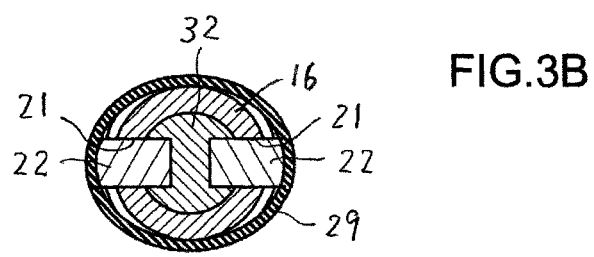
FIG. 3B is a section taken along a line 3B-3B of FIG. 3A.
Figure 3A:
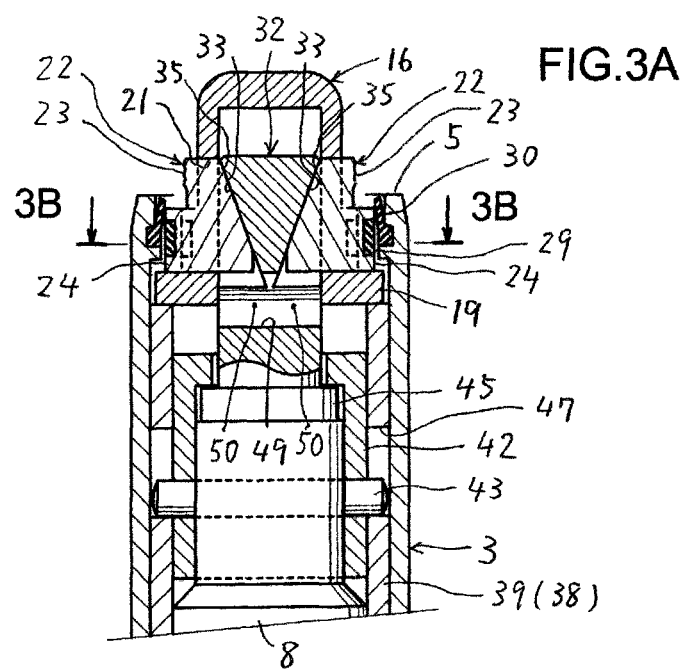
FIG. 3A shows an idly clamping state of the clamping apparatus, and is a partial sectional view similar to FIG. 1A.

If the clamping apparatus is driven for clamping without a workpiece, or if the clamping apparatus is driven for clamping of a workpiece having a hole with an excessively large diameter, the connection pin 43 is received by the lower walls of the pin holes 47, 47, as shown in an idly clamping state of FIG. 3A and FIG. 3B. This structure prevents the piston rod 8 from descending a distance greater than the predetermined distance, relative to the support cylinder 39. This prevents the dust seal 30 from being excessively compressed by each locking member 22.

Further, in this idly clamping state, a lower end of the piston 7 is received by a bottom wall 12a (see FIG. 1A) of the unclamp chamber 12. This prevents an excessive descent of the piston 7 and the support cylinder 39.

The above-described embodiment has the following advantages.

The inclination angle of each wedge surface 33 relative to the axis of the clamp rod 32 is set within the range from 10 degrees to 40 degrees, and each recess 50 is configured to accommodate the inner base portion of the corresponding locking member 22 in the unclamping position. Thus, the radially movable distance of each locking member 22 is increased. This expands the allowable range with respect to the diameter of the hole of the to-be-clamped object. As a result, the clamping apparatus of the present invention is adaptable to different workpieces (to-be-clamped objects), i.e., workpieces each having a smaller-diameter hole and workpieces each having a larger-diameter hole. That is, the single clamping apparatus is capable of clamping a workpiece having a smaller-diameter hole and a workpiece having a larger-diameter hole.

The above-described embodiment can be modified as follows.

Pressurized fluid used in the driving means D may be liquid such as pressurized oil, instead of compressed air. The driving means D may be of a single-acting type such as a spring-releasing type or a spring-locking type, instead of the double-acting type, which has been described as an example.

Further, the driving means D may be another type of actuator such as an electric motor, instead of the fluid pressure actuator.

The pair of recesses 50, 50 are merely required to be formed in the outer peripheral surface of the clamp rod 32. The pair of recesses 50, 50 do not have to be communicatively connected to each other.

The guide member 16 may be omitted to expose the locking member 22 to the outside.

Moreover, it is a matter of course that other changes or alterations can be made on the present invention within the scope of envisagement of one skilled in the art.

REFERENCE SIGNS LIST

1: housing, 7: piston, 8: piston rod, 16: guide member, 18: peripheral wall, 21: guide grooves, 22: locking member, 32: clamp rod, 33: wedge surface, 38: advancing means, 39: support cylinder, 40: spring, 42: connection cylinder, 43: connection pin, 47: pin hole, 50: recess, D: driving means

The invention claimed is:

1. A clamping apparatus comprising:
a pair of locking members (22) (22) protruding toward a leading end side relative to a housing (1) and configured to be inserted into a hole of a to-be-clamped object, the pair of locking members (22) (22) being arranged to be capable of being respectively pressed onto opposed portions of an inner peripheral surface of the hole; an advancing means (38) configured to push the pair of locking members (22) (22) with a predetermined force toward the leading end side; a clamp rod (32) including wedge surfaces (33) (33) respectively engaged with the pair of locking members (22) (22) from the leading end side; and a driving means (D) configured to drive the clamp rod (32) toward a base end side for clamping and to drive the clamp rod (32) toward the leading end side for unclamping, wherein
the pair of locking members (22)(22) include inclined surfaces (35)(35) which are inclined so that the distance from a central axis of the clamp rod (32) decreases toward the base end side and are engaged with the wedge surfaces (33)(33);
the clamp rod (32) includes a through hole (49) formed, in an outer peripheral surface of the clamp rod (32), at a portion of the clamp rod (32) which is located on the base end side relative to the wedge surfaces (33) (33), the through hole (49) being configured to respectively accommodate the pair of locking members (22) (22) in such a manner that inner base portions of the pair of locking members (22) (22) in an unclamping position are allowed to contact each other or to get closer to each other; the through hole (49) being formed to extend to a position closer to the central axis of the clamp rod (32) than a base portion of a corresponding one of the wedge surfaces (33) (33), and
the through hole (49) penetrates the clamp rod (32) in a direction intersecting with the central axis of the clamp rod (32).

2. The clamping apparatus according to claim 1, wherein an inclination angle of each wedge surface (33) relative to the central axis of the clamp rod (32) is set within a range from 10 degrees to 40 degrees.

3. The clamping apparatus according to claim 2, wherein the inclination angle of each wedge surface (33) is set within a range from 15 degrees to 25 degrees.

4. The clamping apparatus according to claim 1, wherein:
the driving means (D) includes a piston (7) inserted into the housing (1), and a piston rod (8) protruding from the piston (7) toward the leading end side;
the advancing means (38) includes a support cylinder (39) and a spring (40) urging the support cylinder (39) toward the leading end side, the support cylinder (39) being inserted into a first annular space between the housing (1) and the piston (8) and being capable of receiving the pair of locking members (22)(22) from the base end side;
a connection cylinder (42) connecting the piston rod (8) with the clamp rod (32) is inserted into a second annular space between the support cylinder (39) and the piston rod (8), and the connection cylinder (42) and the piston rod (8) are fixed to each other by a connection pin (43) extending radially; and
wherein the connection pin (43) comprises end portions, wherein both end portions of the connection pin (43) are respectively inserted into pin holes (47)(47) formed in a peripheral wall of the support cylinder (39).

5. The clamping apparatus according to claim 4, further comprising
a guide member (16) which protrudes toward the leading end side relative to the housing (1) and includes a peripheral wall (18) configured to be inserted into the hole of the to-be-clamped object, the guide member (16) including a guide groove (21) penetrating the peripheral wall (18), the guide member (16) being configured to support the corresponding locking member (22) so that the pair of locking member (22) is movable radially, wherein
the support cylinder (39) is configured to receive the pair of locking members (22) (22) via the guide member (16) from the base end side.

6. A clamping apparatus comprising:
a pair of locking members (22) (22) protruding toward a leading end side relative to a housing (1) and configured to be inserted into a hole of a to-be-clamped object, the pair of locking members (22) (22) being arranged to be capable of being respectively pressed onto opposed portions of an inner peripheral surface of the hole; an advancing means (38) configured to push the pair of locking members (22) (22) with a predetermined force toward the leading end side; a clamp rod (32) including wedge surfaces (33) (33) respectively engaged with the pair of locking members (22) (22) from the leading end side; and a driving means (D) configured to drive the clamp rod (32) toward a base end side for clamping and to drive the clamp rod (32) toward the leading end side for unclamping, wherein
the pair of locking members (22)(22) include inclined surfaces (35)(35) which are inclined so that the distance from a central axis of the clamp rod (32) decreases toward the base end side and are engaged with the wedge surfaces (33)(33);
the clamp rod (32) includes recesses (50 50) formed, in an outer peripheral surface of the clamp rod (32), at a portion of the clamp rod (32) which is located on the base end side relative to the wedge surfaces (33) (33), the recesses (50) (50) being configured to respectively accommodate the pair of locking members (22) (22) in such a manner that inner base portions of the pair of locking members (22) (22) in an unclamping position are allowed to contact each other or to get closer to each other; each of the recesses (50) (50) being formed to extend to a position closer to the central axis of the clamp rod (32) than a base portion of a corresponding one of the wedge surfaces (33) (33);

the driving means (D) includes a piston (7) inserted into the housing (1), and a piston rod (8) protruding from the piston (7) toward the leading end side;

the advancing means (38) includes a support cylinder (39) and a spring (40) urging the support cylinder (39) toward the leading end side, the support cylinder (39) being inserted into a first annular space between the housing (1) and the piston rod (8) and being capable of receiving the pair of locking members (22) (22) from the base end side;

a connection cylinder (42) connecting the piston rod (8) with the clamp rod (32) is inserted into a second annular space between the support cylinder (39) and the piston rod (8), and the connection cylinder (42) and the piston rod (8) are fixed to each other by a connection pin (43) extending radially; and wherein the connection pin (43) comprises end portions, wherein both end portions of the connection pin (43) are respectively inserted into pin holes (47) (47) formed in a peripheral wall of the support cylinder (39), and a base end wall of each pin hole (47) prevents the piston rod (8) from moving toward the base end side a distance greater than a predetermined distance relative to the support cylinder (39).

\* \* \* \* \*